United States Patent [19]

Dufresne et al.

[11] Patent Number: 5,062,946

[45] Date of Patent: Nov. 5, 1991

[54] CATALYTIC DEWAXING PROCESS

[75] Inventors: Pierre Dufresne, Rueil-Malmaison; Francis Raatz, Acheres, both of France

[73] Assignee: Institut Francais du Petrole, Rueil-Malmaison, France

[21] Appl. No.: 541,859

[22] Filed: Jun. 21, 1990

[30] Foreign Application Priority Data

Jun. 21, 1989 [FR] France .................. 89 08358

[51] Int. Cl.$^5$ ............................................. C10G 11/08
[52] U.S. Cl. .................................. 208/115; 208/119; 208/120
[58] Field of Search ............... 208/115, 119, 120

[56] References Cited

U.S. PATENT DOCUMENTS

| | | | |
|---|---|---|---|
| 4,208,305 | 6/1980 | Kouenhoven et al. | 252/431 N |
| 4,238,318 | 12/1980 | Kouwenhoven et al. | 208/120 |
| 4,416,766 | 11/1983 | Mulaskey | 208/120 |
| 4,431,517 | 2/1984 | Nevitt et al. | 208/120 |
| 4,454,365 | 6/1984 | Klotz | 208/120 |
| 4,678,766 | 7/1987 | Rosinski | 208/120 |
| 4,683,051 | 7/1987 | Rodewald | 208/120 |
| 4,818,369 | 4/1989 | Bortz | 208/120 |
| 4,826,792 | 5/1989 | Le et al. | 208/120 |
| 4,836,911 | 6/1989 | Skeels et al. | 208/120 |
| 4,869,806 | 9/1989 | Degnan et al. | 208/120 |
| 4,898,661 | 2/1990 | Ushio et al. | 208/120 |

FOREIGN PATENT DOCUMENTS 2567868 1/1986 France .

OTHER PUBLICATIONS

J. L. Guth et al., "New Route to Pentasil-Type Zeolites Using a Non Alkaline Medium in the Presence of Fluoride Ions", Y. Murakami et al., eds., New Developments in Zeolite Science and Technology . . . , 1986, pp. 121–128.

*Primary Examiner*—Curtis R. Davis
*Assistant Examiner*—William C. Diemler
*Attorney, Agent, or Firm*—Millen, White & Zelano

[57] ABSTRACT

The invention relates to a process for dewaxing an atomspheric or a vacuum gas oil in the presence of at least one catalyst comprising:

a/ 2 to 99.4% by weight of a synthetic crystalline zeolite of the ferrisilicate type, the approximate chemical formula of the zeolite being $M_{2/n}O$, $Fe_2O_3$, $xSiO_2$ where M represents a proton and/or a metal cation, n is the valence of M and x is a number ranging from 40 to 1,000, the zeolite having been synthetized in a fluoride medium and showing a fluorine content ranging from about 0.01 to 1.6% by weight, the zeolite having an X-ray diffraction diagram represented in Table 1 of the description;

b/ 0.1 to 97.5% by weight of a matrix; and c/ at least one promoter selected from the group consisting of Pd, Pt, NiO, CoO, $MoO_3$ and $WO_3$.

20 Claims, No Drawings

CATALYTIC DEWAXING PROCESS

BACKGROUND OF THE INVENTION

The present invention relates to a process for treating petroleum charges and, particularly, for the catalytic dewaxing of hydrocarbons to improve the behavior at cold temperatures (or "cold behavior") of petroleum cuts, for example kerosene, lubricating oils or atmospheric or vacuum gas oils.

In attempts to increase the production of light products to the detriment of residual fuel oil, refiners try to raise the final distillation point of the distillate and the gas oil. But, in addition to the need to restrict sulfur content, below a certain level, another difficulty arises with respect to the cold behaviour of gas oil.

In fact, these factors most often limit the production of gas oil or of heating oil. They are defined by two standards:

AFNOR No T 60,105 for the pour point (P.P.) and the cloud point (C.P.)

AFNOR No M 07,042 for the limiting filtrability temperature (L.F.T.).

The cloud point (expressed in °C.) is the temperature at which the first paraffin crystals appear, whereas the pour point corresponds to the total coagulation of the product. The limiting filtrability temperature, halfway between the two previous features, is related to the "pumpability" of the gas oil across a filter in standard conditions.

It is widely admitted that the problems posed by the cold behavior of gas oils are linked to their long-chained linear paraffin content which generally ranges between 10% and 40 % by weight.

One of the ways permitting improving the flow properties of gas oils involves blending them with additives. This technique shows limited effects. As a matter of fact, although it allows to changing the filtrability point and the pour point, it is well-known that is has a very low effect on the cloud point. Moreover, the effect of the additives is sometimes very low on some crudes.

It is possible to obtain good results through catalytic dewaxing, by means of a catalyst based on a solid showing an appropriate geometric selectivity. The solids of the MFI structure are thus particularly well adapted for letting the normal paraffins diffuse rapidly in relation to isoparaffins. So the solids of the MFI type allow cracking selectively the normal paraffins in relation to isomerized paraffins.

OBJECT OF THE INVENTION

The present invention relates to a process for dewaxing hydrocarbons in the presence of at least one catalyst comprising, in well determined proportions (which will be specified further on), a synthetic crystalline zeolite of the ferrisilicate type, a matrix and at least one or several particular metals and/or oxides of metals from group VIII or/and VIB of the periodic table of elements.

DESCRIPTION OF THE INVENTION

Said synthetic crystalline zeolite of the ferrisilicate type, called ferrizeosilite, as well as its preparation process (synthesis in a fluoride medium), are described in European Patent Application No. 273,816 in the name of the applicant.

Zeolites are crystallized tectosilicates. Their tridimensional structure is built by an assembly of tetrahedrons $TO_4$ which share their vertexes, two different tetrahedrons having only one oxygen in common.

Generally speaking, the composition of zeolites can be represented by the empirical formula $M_{2/n}O, Y_2O_3, xZO_2$ in the dehydrated and calcined state. Z and Y respectively represent the tetravalent and trivalent elements of the tetrahedrons $TO_4$; M represents an electropositive element of valence n, such as an alkaline or an alkaline-earth.

In a general way, the zeolites are prepared through the hydrothermal crystallization of reaction mixtures comprising sources of alkaline or alkaline-earth hydroxides, of silica, and oxides or salts of elements such as aluminum which can replace silicon in the tetrahedrons.

Adding to the reaction mixture a generally organic structurer such as an amine or a quaternary ammonium salt is often necessary for developing said zeolite. The pH value of the total preparation is basic and generally higher than 10. It is admitted that the OH- ion concentration facilitates the crystallizing of the zeolite while providing the dissolution of the silica sources and possibly of amphoteric oxides such as alumina, as well as the transfer of the soluble species obtained thereby onto the zeolite in the making.

The use of the F- fluoride anion during synthesis bypasses this difficulty, producing a crystalline ferrisilicate having a structure which is similar to that of MFI-type zeolites.

The zeolite of the ferrisilicate type which is contained in the catalyst used in the dewaxing process according to the invention is characterized by:

a/ the following approximate chemical formula:

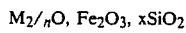

$$M_{2/n}O, Fe_2O_3, xSiO_2$$

where M represents a proton resulting from the thermal decomposition of cations such as for example $NH_4+$ or tetrapropyl or tripropylammonium or tetrapropylphosphonium, which are present alone or mixed in the synthesis medium, and/or a non decomposable metal cation from the reaction medium such as, for example, alkaline and/or alkaline-earth cations or other metals specified hereafter, n is the valence of M, x is a number ranging from 40 to 1,000, b/ an X-ray diffraction diagram represented in Table 1 of the description, and c/ a fluorine content ranging between from about 0.01 to 1.6 % by weight.

Moreover, said zeolite has been synthesized in a fluoride medium.

This zeolite may show at least one crystal size ranging from 0.05 to 500 micrometers (1 m=$10^{-6}$ meter), generally from 0.1 to 200 micrometers and preferably from 0.5 to 120 micrometers. It usually has a molar ratio $SiO_2/Fe_2O_3$ ranging from 40 to 1,000 and preferably from 50 to 750.

It is preferably synthesized in the following way:

a/ a reaction mixture is prepared in the form of a solution with a pH value of less than about 10 and comprising water, at least one source of silica, at least one source of ferric salt, at least one source of a mobilizing agent containing (F-) fluoride ions and at least one source of a structuring agent which can provide organic cations, for example the tetrapropylammonium cations (TPA+), the tetrapropylphosphonium cations (TPP+) and the tripropylammonium cations (TriPA+), said mixture having a composition in terms of molar ratio ranging between the following values:

$SiO_2/Fe_2O_3$:5–2,000
$F^-/SiO_2$:0.04–4
Organic cations/$SiO_2$:0.04–2
$H_2O/SiO_2$:6–500 b/ said mixture is maintained at a heating temperature lower than 250° C. until a crystalline compound is obtained, and c/ said compound is calcined at a temperature higher than 400° C., for example between 450° and 900° C.

The sources of a structuring agent which can provide organic cations are preferably tetrahydrocarbylammonium, trihydrocarbylammonium, tetrahydrocarbylphosphonium cations, hydrocarbyl being advantageously alkyl and preferably propyl.

Other structuring or chelating agents can be used, as admitted in prior art, notably compounds having amine, ketone, alcohol, acid functions, for example, amino alcohols, amino acids, polyalcohols or tertiary amines.

The mixture can be advantageously heated in an autoclave fitted with a polytetrafluoroethylene (PTFE) inner lining between about 60° and 210° C. and preferably between 70° and 190° C. for a duration which may range from 0.5 to 1,100 hours according to the reaction temperature, until a crystallized solid is obtained which is separated from the mother liquors by filtration and then washed with distilled water.

The reaction mixture can be advantageously prepared with a pH value ranging from about 2.5 to about 10 and preferably from 4 to 8.

The molar ratios of the reaction mixture constituents preferably range between the following values (expressed in molar ratios):

$SiO_2/Fe_2O_3$:10–1,000
$F^-/SiO_2$:0.1–1.5
Organic cations/$SiO_2$:0.08–1
$H_2O/SiO_2$:15–350

Said reaction mixture can be admixed with at least one additional salt in a molar ratio additional salt/$SiO_2$ generally ranging from about 0.1 to 4 and preferably from 0.2 to 0.5 and/or at least one crystal nucleus of the zeolite formed through the process above in a ratio by weight crystal/$SiO_2$ generally ranging from 0.01 to 0.1 and preferably from 0.02 to 0.03, so that the morphology, the size of the crystals as well as the kinetics of the crystallization reaction can be advantageously controlled.

The crystals of said zeolite are advantageously calcined at a temperature ranging from about 520° to 590° C. in a dry gas atmosphere, such as air or an inert gas, in order to decompose the structuring agent present in the pores of the zeolite.

The synthesis method described above applies to the preparing of zeolites of the pentasil group and related to the zeolites of the MFI type, while being distinguished from the latter ones by X-ray diffraction diagram and chemical composition particularities.

The various drawbacks linked to the methods for preparing zeolites of the ferrisilicate type in a basic medium disappear when the syntheses are carried out in aqueous media with a pH value generally lower than 10 and containing fluoride ions. The cations derived from alkaline or alkaline-earth metals can thus be replaced by $NH^{4+}$ cations with all the advantages ensuing from the use of these latter cations. The solubilization of the silica and iron sources is provided by the fluoride ions which constitute the mobilizing agent and which thus replace the hydroxyl ions of the basic media. Under these conditions, it is possible to obtain crystals of zeolites of the ferrisilicate type with molar ratios $SiO_2/Fe_2O_3$ generally ranging from about 40 to 1,000. Said crystals have sizes which can be controlled from the various synthesis parameters (reagent concentration, stirring, temperature, duration), and the size of said crystals may range between 0.05 micrometers and 500 micrometers.

During the synthesis of said ferrizeosilite, it is possible to advantageously work in a stirred medium, which allows to considerably decrease the reaction time.

The pH value of the reaction medium, lower than 10, can be obtained either directly from one or several of the utilized reagents, or by adding an acid, a base, an acid salt, a basic salt or an additional buffer mixture.

Numerous silica sources can be used. Silicas in the form of hydrogels, aerogels, pseudosolutions can be cited, as well as the silicas resulting from the precipitation of solutions of soluble silicates or from the hydrolysis of silicic esters such as orthosilicic acid tetraethylic ester $Si(OC_2H_5)_4$ or of complexes such as sodium fluosilicate $Na_2SiF_6$ or ammonium fluosilicate $(NH_4)SiF_6$.

Among the ferric salts that are utilized, hydrated or dehydrated ferric chloride, hydrated or not, $FeCl_3 6-H_2O$ or $FeCl_3$, nonahydrated ferric nitrate $Fe(NO_3)_3 9-H_2O$, pentahydrated ferric sulfate and ferric perchlorate will be preferably selected. Besides, instead of starting with separate sources of silica and of a ferric salt, it is also possible to take sources where the two elements are combined, such as, for example, a freshly precipitated ferrisilicate gel.

The $F^-$ fluoride anions can be generally introduced in the form of salts of said structuring agents or of ammonium or alkali metals such as, for example, NaF, $NH_4F$, $NH_4HF_2$, TriPA-F, TPA-F, TPP-F, or in the form of hydrolyzable compounds which can release fluoride anions in water, such as silicon fluoride $SiF_4$ or ammonium fluosilicate $(NH_4)_2SiF_6$ or sodium fluosilicate $Na_2SiF_6$.

The TPA+, TPP+ or TriPA+ cations, which are the structuring agents, are preferably added in the form of their salts, for example bromides, fluorides, etc, but the corresponding amines (tripropylamine for example) can also be added and then salified by acid, for example fluohydric acid.

The acids or acid salts, bases or basic salts which are optionally added in order to bring the pH of the medium to the required value can be selected among the usual acids such as, for example, HF, HCl, $HNO_3$, $H_2SO_4$, $CH_3COOH$ or the acid salts such as, for example, $NH_4HF_2$, $KHF_2$, $NaHSO_4$, $KHSO_4$, the usual bases such as, for example, $NaHCO_3$, $Na_2CO_3$, $CH_3COONa$, $Na_2S$, NaHS or the buffer mixtures such as, for example, ($CH_3COOH$, $CH_3COONa$) or ($NH_4OH$, $NH_4Cl$).

The evolution of the composition within the ferrizeosilite crystals can be advantageously modulated, on one hand, according to the sources of silica and of the ferric salt used, and on the other hand according to the silica/iron ratios that are used.

Identifying the ferrizeosilites can be easily achieved from their X-ray diffraction diagram. This diffraction diagram can be obtained by means of a diffractometer by using the conventional powder method with the K $\alpha$ radiation of copper. Using an inner standard the values of the angles 2 $\theta$ associated with the diffraction peaks can be precisely determined. The different interreticular distances $d_{hkl}$, characteristic of the sample, are calculated from BRAGG's relationship. The measuring error estimate $\Delta$ $(d_{hkl})$ to $d_{hkl}$ is calculated, depending on the measuring error $\Delta$ $(2\ \theta)$ assigned to the measuring of 2 $\theta$, through BRAGG's relationship. In the presence of an inner standard, this error is minimized to ±0.05. The relative intensity I/Io assigned to each value of $d_{hkl}$ is estimated from the height of the corresponding diffraction peak. A scale of symbols is often utilized to characterize this intensity FF=very strong, F=strong, mF=average to strong, m=average, mf=average to weak, f=weak, ff=very weak.

Table 1 thus represents the X-ray diffraction diagram characteristic of the zeolites of the ferrisilicate type obtained with the synthesis method described above and calcined at 550° C. The extreme values which can be taken by the different reticular equidistances $d_{hkl}$ (expressed in Angströms) are represented in the $d_{hkl}$ column. The "o" column corresponds to a ferrizeosilite which crystallizes in the orthorhombic system (Si/Fe weak), and the "m" column corresponds to a ferrozeosilite crystallizing in the monoclinic system (Si/Fe high). The variations that are observed are essentially linked to the nature of the compensation cations and to the Si/Fe ratio of the zeolite. Each one of these values must be assigned the measuring error $\Delta$ $(d_{hkl})$ ranging from ±0.07 to ±0.002 according to the value of 2 $\theta$ (1 Angström = $10^{-10}$ meter).

The catalyst used in the dewaxing process according to the present invention comprises:

a/ 2 to 99.4 %, preferably 9% to 85% by weight of a synthetic crystalline zeolite of the ferrisilicate type which has been described previously, said zeolite having the approximate chemical formula $M_{2/n}O$, $Fe_2O_3$, $xSiO_2$ where M represents a proton and/or a metal cation, n is the valence of M and x is a number ranging from 40 to 1,000, said zeolite having been synthesized in a fluoride medium and showing a fluorine content ranging from about 0.01 to 1.6 % by weight, said zeolite having an X-ray diffraction diagram represented in Table 1 of the description, b/ 0.1 to 97.5 %, preferably 9 to 85 % by weight of a matrix, and c/ at least one promoter selected from the group consisting of:
Pd at a concentration by weight ranging from 0.05 to 5%, preferably from 0.1 to 3%
Pt at a concentration by weight ranging from 0.05 to 5%, preferably from 0.1 to 3%
NiO at a concentration by weight ranging from 0.5 to 16%, preferably from 2 to 10%
CoO at a concentration by weight ranging from 0.5 to 16%, preferably from 2 to 10%
$MoO_3$ at a concentration by weight ranging from 0.1 to 30%, preferably from 6 to 25%
$WO_3$ at a concentration by weight ranging from 0.1 to 40%, preferably from 6 to 30%.

Said synthetic crystalline zeolite of the ferrisilicate type is thus shaped by using a matrix or a binder that may be inert or active for the reaction to be promoted. The matrix which is used in the catalyst of the process according to the invention is usually selected from the group consisting of the clays, the aluminas, silica, magnesia, zircon, titanium oxide, boron oxide and any combination of at least two of the compounds cited above, such as silica-alumina, silica-magnesia, etc. All the well-known tableting and shaping methods are applicable, such as, for example extrusion, pelletizing, oil drop, etc.

The catalyst contains a hydrogenizing function which is based on at least one of the metals cited above, i.e., palladium and platinum or/and at least one of the following metal oxides : NiO, CoO, $MoO_3$, $WO_3$. One of the following couples of metal oxides will be preferably used as a promoter : $MoO_3$-NiO, $WO_3$-NiO, $MoO_3$-CoO, with weight ratios $MoO_3$/NiO, $WO_3$/NiO, $MoO_3$/CoO usually ranging from 0.5 to 9.5 and preferably from 1.5 to 8.

The promoter is usually deposited through the impregnation of the (zeolite+matrix) support by metallic salt solutions such as, for example acetate, nitrate or chloride for nickel and cobalt, tetrammine metal nitrate or chloride for palladium and platinum, ammonium molybdate or tungstates. In the case of the metal oxide couples $MoO_3$-NiO, $WO_3$-NiO and $MoO_3$-CoO, the nickel or cobalt salt can be deposited after a first impregnation of the support by the solution of salt of the metal from group VI B, followed by calcining between 200° and 550° C., but it can also be deposited at the same time as the salt of the metal from group VI B. After the last impregnation, the catalyst is generally dried between 80° and 300° C., then calcined between 350° and 700° C. and preferably between 420° and 600° C.

The catalyst used in the present invention can contain phosphorus, the amount of phosphorus expressed in weight of oxide $P_2O_5$ in relation to the weight of catalyst ranging from 0.1 to 15% and preferably from 1 to 10%. Phosphorus is advantageously present notably when it is associated with nickel and molybdenum oxides. It can then be introduced simultaneously with the nickel and the molybdenum, for example, in the form of phosphoric acid of formula $H_3PO_4$.

The operating conditions of the process for dewaxing hydrocarbons (for example, a gas oil) according to the invention, a process in which said catalyst is utilized, are preferably the following:

Pressure between 0.5 and 10 MPa and preferably between 1 and 7 MPa.
Temperature between 200° and 500° C. and preferably between 250° and 430° C.
Space velocity, expressed in volume of charge per volume unit of catalyst and per hour, between 0.1 and 4 and preferably between 0.3 and 2.
Volume ratio $H_2$/hydrocarbons (for example $H_2$/gas oil) ranging from 100 to 1,500 liters per liter and preferably from 200 to 1,000 liters per liter.

The process according to the invention can improve the cold behavior of an atmospheric gas oil or a vacuum gas oil characterized by an initial point ranging from 200° to 420° C. and a final point ranging from 320° to 650° C., a sulfur content ranging from 0.1 to 3.5% by weight and showing pour and cloud points higher than 0° C.

The process according to the invention in the conditions described above results in pour points and cloud points higher than 10° C. In case the catalyst contains the oxide couples $MoO_3$-NiO, $WO_3$-NiO or/and $MoO_3$-CoO, desulfurization rates higher than 90% can be achieved.

TABLE 1

| $d_{hkl}$ | | | $d_{hkl}$ | | |
|---|---|---|---|---|---|
| o | m | I/Io | o | m | I/Io |
| 11.14 | 11.10 | FF | 3.44 | 3.45 | mf |
| 9.99 | 9.92 | FF | | 3.43 | mf |

TABLE 1-continued

| $d_{hkl}$ o | $d_{hkl}$ m | I/Io | $d_{hkl}$ o | $d_{hkl}$ m | I/Io |
|---|---|---|---|---|---|
| 9.76 | 9.76 | mF | 3.38 | 3.37 | ff |
| 9.02 | 9.00 | f | 3.353 | 3.353 | mF |
| 8.08 | 8.03 | ff | 3.321 | 3.313 | mF |
| 7.45 | 7.42 | f | 3.247 | 3.254 | f |
| 7.10 | 7.06 | ff | 3.133 | 3.131 | ff |
| 6.72 | 6.69 | f | | 3.058 | m |
| 6.38 | 6.36 | m | 3.052 | | m to mf |
| 6.03 | 5.99 | mF | | 3.036 | m |
| 5.95 | 5.93 | mF | 2.990 | 2.986 | m |
| | 5.72 | m | | 2.955 | mf |
| 5.70 | | m | 2.942 | | mf |
| | 5.68 | m | | 2.921 | ff |
| 5.57 | 5.57 | m | 2.866 | 2.864 | ff |
| 5.38 | 5.38 | ff | 2.783 | 2.782 | ff |
| | 5.33 | ff | 2.733 | 2.733 | f |
| 5.15 | 5.13 | ff | 2.685 | 2.679 | ff |
| 5.04 | 5.03 | m | 2.662 | 2.660 | ff |
| 4.99 | 4.97 | mF | | 2.613 | f |
| 4.88 | 4.88 | ff | 2.605 | | f |
| 4.62 | 4.62 | mf | | 2.589 | f |
| 4.46 | 4.40 | ff | 2.510 | 2.513 | f |
| 4.37 | 4.36 | mf | 2.488 | 2.484 | mf |
| 4.27 | 4.26 | m | 2.455 | 2.457 | ff |
| 4.09 | 4.08 | ff | 2.441 | 2.441 | ff |
| 4.01 | 4.01 | f | 2.416 | 2.413 | f |
| 3.86 | 3.85 | FF | 2.395 | 2.392 | f |
| 3.82 | 3.82 | FF | 2.325 | 2.324 | ff |
| | 3.80 | FF | 2.275 | 2.274 | ff |
| | 3.76 | F | 2.203 | 2.202 | ff |
| 3.75 | 3.74 | F | 2.011 | 2.011 | m to mf |
| 3.72 | 3.71 | F | 1.992 | 1.987 | mF |
| | 3.66 | mF | | | |
| 3.65 | 3.62 | mF | | | |
| 3.56 | 3.56 | ff | | | |
| 3.49 | 3.49 | f | | | |

("o" orthorhombic ferrizeosilite; "m" monoclinic ferrizeosilite)

The hydrocarbon charge can optionally be pretreated for example by partly hydrotreating the charge (notably hydrodesulfurization, hydrodenitrogenation and hydrogenation reactions of the aromatics contained in the charge) by means of an appropriate catalyst, for example, based on nickel and molybdenum deposited on alumina.

EXAMPLES

The following examples illustrate the present invention without limiting the scope thereof.

EXAMPLE 1

Preparation of a ferrizeosilite (solid Z) in accordance with that which is used in the invention.

A solution containing 18.80 g of hexahydrated ferric chloride, 59.25 g of tetrapropylammonium bromide (TPABr) and 51.50 g of ammonium fluoride in 5 liters of water is prepared. This solution is admixed with 167.15 g of powdery silica obtained by pyrohydrolyzing silicon tetrachloride and marketed by the Degussa company under the name "Aerosil". The latter one contains about 3% by mass of water and less than 0.002% by weight of aluminum.

The mixture (pH=6) is heated for 15 days at 170° C. in an autoclave. The final suspension (pH=6) is filtered and the solid is washed with water, dried then calcined at 550° C. under a mixture of 20% of air in 80% of nitrogen for 9 hours.

The X-ray diffraction analysis of the rehydrated calcined product shows that it is a ferrizeosilite (solid Z) characterized by the diffraction diagram of Table 1. The chemical analysis of this ferrizeosilite shows an iron content of 2.05% and a fluorine element content of 0.06% by weight and a molar ratio $SiO_2/Fe_2O_3$ equal to 84.

EXAMPLE 2

Preparation of a non fluorinated zeolite of the MFI type (solid Z')

A zeolite of structure MFI and of Si/Fe ratio=25 is synthesized in a basic medium and the H form is prepared according to the techniques known in prior art and notably described in German Patent No. 2,831,611 and European Patent No. 115,031.

EXAMPLE 3

Preparation of a zeolite of the MFI type not fluorinated in accordance with that which is used in the invention (solid Z").

Solid Z' (obtained in example 2) is subjected to a treatment at 450° C. under an atmosphere containing $CHF_3$ for 4 hours. Its fluorine content after this treatment is 0.15% by weight and its diffraction spectrum, in accordance with the indications of Table 1, shows that the product is still well crystallized. This product is referred to as Z".

EXAMPLE 4

Manufacturing of catalysts

Catalysts are manufactured from solids Z, Z' and Z" the preparation of which is respectively described in examples 1, 2 and 3.

Each solid Z, Z' and Z" is admixed with an alumina gel of the CATAPAL type (marketed by the CONDEA company) in a proportion by dry weight of 40% solid Z (or Z' or Z") - 60% alumina. The mixture is kneaded, then extruded in grains with a diameter of 1.6 millimeter. The obtained grains are dried at 120° C. for 15 hours, then calcined under air at 550° C. for 2 hours. The following supports are obtained:
- a support S comprising zeolite Z
- a support S' comprising zeolite Z'
- a support S" comprising zeolite Z"

1. First series of catalysts (in accordance with those used in the invention).
   a/ Support S is impregnated by an aqueous solution of ammonium heptamolybdate, then dried at 120° C. and calcined at 350° C. It is then impregnated by an aqueous solution of nickel nitrate, dried and calcined at 500° C., in order to obtain a catalyst comprising 3% by weight of NiO and 8% by weight of $MoO_3$ (catalyst C).
   b/ a/ is repeated but in order to obtain a catalyst comprising 8% by weight of NiO and 16% by weight of $MoO_3$ (catalyst D).
   c/ Support S is impregnated by an aqueous solution of ammonium metatungstate, then dried at 120° C. and calcined at 350° C. It is then impregnated by an aqueous solution of nickel nitrate, dried and calcined at 500° C., in order to obtain a catalyst comprising 3% by weight of NiO and 8% by weight of $WO_3$ (catalyst $C_1$).
   d/ c/ is repeated but in order to obtain a catalyst comprising 8% by weight of NiO and 16% by weight of $WO_3$ (catalyst $D_1$).
   e/ Support S is impregnated by an aqueous solution of ammonium heptamolybdate, then dried at 120° C. and calcined at 350° C. It is then impregnated by an aqueous solution of cobalt nitrate, dried and calcined at 500° C., in order to obtain a catalyst comprising 3% by weight of CoO and 8% by weight of $MoO_3$ (catalyst $C_2$).

f/ e/ is repeated but in order to obtain a catalyst comprising 8% by weight of CoO and 16% by weight of $MoO_3$ (catalyst $D_2$).

g/ Support S is impregnated by an aqueous solution of tetrammine palladium chloride, dried and calcined at 430° C., in order to obtain a catalyst comprising 0.4% by weight of Pd (catalyst $C_3$).

h/ Support S is impregnated by an aqueous solution of tetrammine platinum chloride, dried and calcined at 450° C., in order to obtain a catalyst comprising 0.4% by weight of Pt (catalyst $C_4$).

i/ Support S is impregnated by a mixture of an aqueous solution of ammonium heptamolybdate and of an aqueous solution of phosphoric acid, then dried at 120° C. and calcined at 350° C. It is then impregnated by an aqueous solution of nickel nitrate, dried and calcined at 500° C., in order to obtain a catalyst comprising 3% by weight of NiO, 8% by weight of $MoO_3$ and 2% by weight of $P_2O_5$ (catalyst $C_5$).

2. Second series of catalysts (not in accordance with those used in the invention).

1.a/, 1.c/ and 1.g/ are respectively repeated by replacing support S by support S' and catalysts respectively comprising 3% by weight of NiO and 8% by weight of $MoO_3$ (catalyst C'), 3% by weight of NiO and 8% by weight of $WO_3$ (catalyst $C'_1$), 0.4% by weight of Pd (catalyst $C'_2$) are obtained.

3. Third series of catalysts (not in accordance with those used in the invention).

1.a/, 1.c/ and 1.g/ are respectively repeated by replacing support S by support S" and catalysts respectively comprising 3% by weight of NiO and 8% by weight of $MoO_3$ (catalyst C"), 3% by weight of NiO and 8% by weight of $WO_3$ (catalyst $C"_1$), 0.4% by weight of Pd (catalyst $C"_2$) are obtained.

4. Fourth series of catalysts (not in accordance with those used in the invention).

a/ Support S is impregnated by a chromic acid solution, then dried at 120° C. and calcined at 350° C. It is then impregnated by an aqueous solution of nickel nitrate, dried and calcined at 500° C., in order to obtain a catalyst comprising 3% by weight of NiO and 8% by weight of $Cr_2O_3$ (catalyst E).

b/ Support S is impregnated by a chromic acid solution, then dried at 120° C. and calcined at 350° C. It is then impregnated by an aqueous solution of cobalt nitrate, dried and calcined at 500° C., in order to obtain a catalyst comprising 8% by weight of CoO and 16% by weight of $Cr_2O_3$ (catalyst $E_1$).

c/ Support S is impregnated by an aqueous solution of ammonium heptamolybdate, then dried at 120° C. and calcined at 350° C. It is then impregnated by an aqueous solution of iron nitrate, dried and calcined at 500° C., in order to obtain a catalyst comprising 3% by weight of FeO and 8% by weight of $MoO_3$ (catalyst $E_2$).

d/ Support S is impregnated by an aqueous solution of ammonium metatungstate, then dried at 120° C. and calcined at 350° C. It is then impregnated by an aqueous solution of iron nitrate, dried and calcined at 500° C., in order to obtain a catalyst comprising 8% by weight of FeO and 16% by weight of $WO_3$ (catalyst $E_3$).

TABLE 2

Composition of the catalysts prepared in example 4

| (**) CATALYST | SUPPORT(*) | | | COMPOSITION (% by weight) METALS OR METAL OXIDES | | | | | | | | |
|---|---|---|---|---|---|---|---|---|---|---|---|---|
| | S | S' | S" | Pd | Pt | NiO | CoO | FeO | $CrO_3$ | $MoO_3$ | $WO_3$ | $P_2O_5$ |
| C | 89 | — | — | — | — | 3 | — | — | — | 8 | — | — |
| D | 76 | — | — | — | — | 8 | — | — | — | 16 | — | — |
| $C_1$ | 89 | — | — | — | — | 3 | — | — | — | — | 8 | — |
| $D_1$ | 76 | — | — | — | — | 8 | — | — | — | — | 16 | — |
| $C_2$ | 89 | — | — | — | — | — | 3 | — | — | 8 | — | — |
| $D_2$ | 76 | — | — | — | — | — | 8 | — | — | 16 | — | — |
| $C_3$ | 99.6 | — | — | 0.4 | — | — | — | — | — | — | — | — |
| $C_4$ | 99.6 | — | — | — | 0.4 | — | — | — | — | — | — | — |
| $C_5$ | 87 | — | — | — | — | 3 | — | — | — | 8 | — | 2 |
| C' | — | 89 | — | — | — | 3 | — | — | — | 8 | — | — |
| $C'_1$ | — | 89 | — | — | — | 3 | — | — | — | — | 8 | — |
| $C'_2$ | — | 99.6 | — | 0.4 | — | — | — | — | — | — | — | — |
| C" | — | — | 89 | — | — | 3 | — | — | — | 8 | — | — |
| $C"_1$ | — | — | 89 | — | — | 3 | — | — | — | — | 8 | — |
| $C"_2$ | — | — | 99.6 | 0.4 | — | — | — | — | — | — | — | — |
| E | 89 | — | — | — | — | 3 | — | — | 8 | — | — | — |
| $E_1$ | 76 | — | — | — | — | — | 8 | — | 16 | — | — | — |
| $E_2$ | 89 | — | — | — | — | — | — | 3 | — | 8 | — | — |
| $E_3$ | 76 | — | — | — | — | — | — | 8 | — | — | 16 | — |

(*)Support S = 60% of alumina + 40% of ferrizeosilite (fluorinated during its synthesis)
Support S' = 60% of alumina + 40% of zeolite of the MFI type (non fluorinated)
Support S" = 60% of alumina + 40% of zeolite of the MFI type (fluorinated by fluorination).
(% by weight in relation to the total support mass).
(**)Only catalysts C, $C_1$ to $C_5$, D, $D_1$ and $D_2$ are in accordance with those used in the present invention.

EXAMPLE 5

Catalytic dewaxing test

All the catalysts (see Table 2) the preparation of which has been described in the previous example are subjected to a gas oil dewaxing test. The characteristics of the charge are given in Table 3. The tests are carried out in the following conditions:

Total pressure: 45 bars (4.5 MPa)
Temperature ranging from 360° to 380° C.
Feed space velocity (LHSV) in volume of charge per unit of volume of catalyst and per hour=0.5
Volume ratio $H_2$/gas oil=300 liters of gaseous hydrogen/liter of liquid charge.

The catalytic system consists half of a hydrotreatment catalyst disposed at the head of the bed and half of the catalyst to be tested. The former catalyst achieves a partial hydrotreatment of the charge, notably the hydrodesulfurization, hydrodenitrogenation and hydrogenation reactions of the aromatics. The latter catalyst must also partly achieve these reactions and especially the catalytic dewaxing on a charge which has already been partly purified. The catalyst of the first stage that is used is the HR 348 marketed by the PROCATALYSE company; it consists of nickel and molybdenum deposited on alumina.

TABLE 3

CHARACTERISTICS OF THE GAS OIL CHARGE

| ASTM distillation D2887 (°C.) | |
|---|---|
| Initial point | 258 |
| 10% | 302 |
| 30% | 327 |
| 50% | 352 |
| 70% | 381 |
| 90% | 429 |
| Final point | 455 |
| Gravity at 20° C. | 0.893 |
| Sulfur (% by weight) | 1.28 |
| Nitrogen (% by weight) | 350 |
| Pour point (°C.) | +18 |
| Cloud point (°C.) | +19 |

The test is carried out as follows:

After the catalysts have been loaded, they are presulfurized by the mixture of hydrogen sulfur and hydrogen. The pressure is then brought to 45 bars, and the charge is injected at 150° C. and progressively brought to 360° C. After 48 hours at this temperature, the latter is brought to 380° C. for 48 hours.

The catalyst performances, summarized in tables 4 to 6, are expressed by means of the following characteristics:

170+ cut yield by weight (170+ yield)

Cloud point and pour point of cut 170+. The cloud point corresponds to the temperature at which the first paraffin crystals appear. The pour point corresponds to the setting temperature of the solid.

TABLE 4

| CATALYSTS(*) | Pour point | | Cloud point | | 170+ yield (% by weight) | |
|---|---|---|---|---|---|---|
| | 360 | 380 | 360 | 380 | 360 | 380 |
| C | −21 | −36 | −5 | −13 | 90 | 87 |
| D | −18 | −36 | −3 | −10 | 88 | 86 |
| $C_1$ | −15 | −30 | −3 | −7 | 89 | 85 |
| $D_1$ | −15 | −30 | −4 | −10 | 88 | 83 |
| $C_2$ | −12 | −21 | −6 | −11 | 89 | 85 |
| $D_2$ | −3 | −18 | −3 | −8 | 88 | 85 |
| $C_3$ | −6 | −15 | −5 | −12 | 89 | 85 |
| $C_4$ | −9 | −18 | −10 | −13 | 89 | 82 |
| $C_5$ | −22 | −37 | −6 | −13 | 91 | 88 |

(*)Catalysts C, $C_1$ to $C_5$, D, $D_1$ and $D_2$ are in accordance with those used in the present invention.

TABLE 5

| CATALYSTS | Pour point | | Cloud point | | 170+ yield (% by weight) | |
|---|---|---|---|---|---|---|
| | 360 | 380 | 360 | 380 | 360 | 380 |
| C | −21 | −36 | −5 | −13 | 90 | 87 |
| C' | −15 | −30 | −3 | −6 | 90 | 87 |
| C'' | −18 | −30 | −3 | −8 | 86 | 82 |
| $C_1$ | −15 | −30 | −3 | −7 | 89 | 85 |
| $C'_1$ | −12 | −21 | −1 | −5 | 88 | 85 |
| $C''_1$ | −15 | −24 | 0 | −6 | 85 | 82 |
| $C_3$ | −6 | −15 | −5 | −12 | 89 | 85 |
| $C'_2$ | −3 | −12 | −4 | −7 | 88 | 85 |
| $C''_2$ | −3 | −9 | −5 | −11 | 86 | 80 |

Table 5 shows that, in the presence of a catalyst containing a zeolite of the ferrisilicate type synthesized in a fluoride medium (respectively C, $C_1$ and $C_3$), a marked improvement of the cold behavior properties of the gas oil can be obtained, and particularly the lowest pour and cloud points with an excellent 170+ cut yield are obtained, in relation to a process in the presence of a catalyst containing a non fluorinated zeolite of the MFI type (respectively C', $C'_1$ and $C'_2$) or a zeolite of the MFI type fluorinated by fluorination, that is to say by a post-synthesis treatment (respectively C'', $C''_1$ and $C''_2$).

TABLE 6

| CATALYSTS | Pour point | | Cloud point | | 170+ yield (% by weight) | |
|---|---|---|---|---|---|---|
| | 360 | 380 | 360 | 380 | 360 | 380 |
| C | −21 | −36 | −5 | −13 | 90 | 87 |
| $C_1$ | −15 | −30 | −3 | −7 | 89 | 85 |
| E | −3 | −9 | 2 | −3 | 90 | 88 |
| $D_2$ | −3 | −18 | −3 | −8 | 88 | 85 |
| $E_1$ | −3 | −12 | 0 | −6 | 88 | 85 |
| C | −21 | −36 | −5 | −13 | 90 | 87 |
| $C_2$ | −12 | −21 | −6 | −11 | 89 | 85 |
| $E_2$ | 0 | −3 | 3 | 0 | 90 | 87 |
| $D_1$ | −15 | −30 | −4 | −10 | 88 | 83 |
| $E_3$ | −3 | −3 | 3 | 1 | 90 | 87 |

Table 6 shows that, in the presence of a catalyst also containing metals or oxides of metal from group VIII or VI B other than Pd, Pt, NiO, CoO, $MoO_3$, $WO_3$ (respectively E (comprising NiO and $CrO_3$), $E_1$ (comprising CoO and $CrO_3$), $E_2$ (comprising FeO and $MoO_3$), $E_3$ (comprising FeO and $WO_3$)), the performances are lower than those obtained in the presence of a catalyst only comprising such metals or metal oxides as Pd, Pt, NiO, CoO, $MoO_3$ or/and $WO_3$ (respectively C or $C_1$; $D_2$; C or $C_2$; $D_1$).

Finally, the presence of phosphorus (see catalyst $C_5$) still improves the performances of the catalyst according to the invention.

We claim:

1. A process for dewaxing hydrocarbons, comprising subjecting said hydrocarbons to dewaxing conditions in the presence of at least one catalyst comprising:

a/ 2 to 99.4% by weight of a synthetic crystalline zeolite of the ferrisilicate type, the approximate chemical formula of said zeolite being $M_{2/n}O$, $Fe_2O_3$, $xSiO_2$, where M represents a proton and/or a metal cation, n is the valence of M and x is a number ranging from 40 to 1,000, said zeolite having been synthesized in a fluoride medium and showing a fluorine content ranging from about 0.01 to 1.6% by weight, said zeolite having an X-ray diffraction diagram represented in Table 1 of the description, b/ 0.1 to 97.5% by weight of a matrix, and c/ at least one promoter selected from the group consisting of Pd at a concentration by wt. ranging from 0.05 to 5%

Pt at a concentration by wt. ranging from 0.05 to 5%

NiO at a concentration by wt. ranging from 0.5 to 16%

CoO at a concentration by wt. ranging from 0.5 to 16%

$MoO_3$ at a concentration by wt. ranging from 0.1 to 30%

WO$_3$ at a concentration by wt. ranging from 0.1 to 40%.

2. A process according to claim 1, conducted in the presence of at least one catalyst comprising:
   a/ 9 to 85% by weight of said zeolite,
   b/ 9 to 85% by weight of said matrix, and
   c/ at least one promoter selected from the group consisting of:
   Pd at a concentration by wt. ranging from 0.1 to 3%
   Pt at a concentration by wt. ranging from 0.1 to 3%
   NiO at a concentration by wt. ranging from 2 to 10%
   CoO at a concentration by wt. ranging from 2 to 10%
   MoO$_3$ at a concentration by wt. ranging from 6 to 25%
   WO$_3$ at a concentration by wt. ranging from 6 to 30%.

3. A process according to claim 1 wherein said zeolite has a molar ratio SiO$_2$/Fe$_2$O$_3$ ranging from 50 to 750.

4. A process according to claim 1 wherein said matrix is selected from the group consisting of silica, magnesia, zircon, titanium oxide, boron oxide, an alumina, a clay and any combination of at least two of the compounds cited above.

5. A process according to claim 1 wherein said catalyst comprises at least one oxide couple selected from the group consisting of MoO$_3$-NiO, WO$_3$-NiO and MoO$_3$-CoO.

6. A process according to claim 5 wherein said catalyst comprises the oxide couple MoO$_3$-NiO, the weight ratio MoO$_3$/NiO of which ranges from 0.5 to 9.5.

7. A process according to claim 5 wherein said catalyst comprises the oxide couple WO$_3$-NiO, the weight ratio WO$_3$/NiO of which ranges from 0.5 to 9.5.

8. A process according to claim 5 wherein said catalyst comprises the oxide couple MoO$_3$-CoO, the weight ratio MoO$_3$/CoO of which ranges from 0.5 to 9.5.

9. A process according to claim 1 wherein said catalyst also comprises phosphorus in an amount expressed in weight of oxide P$_2$O$_5$ in relation to the weight of catalyst ranging from 0.1 to 15%.

10. A process according to claim 1 for dewaxing an atmospheric gas oil or a vacuum gas oil.

11. A process according to claim 2, wherein said catalyst comprises at least one oxide couple selected from the group consisting of MoO$_3$-NiO, WO$_3$-NiO and MoO$_3$-CoO.

12. A process according to claim 11, wherein said catalyst comprises the oxide couple MoO$_3$-NiO, the weight ratio MoO$_3$/NiO of which ranges from 0.5 to 9.5.

13. A process according to claim 11, wherein said catalyst comprises the oxide couple WO$_3$-NiO, the weight ratio WO$_3$/NiO of which ranges from 0.5 to 9.5.

14. A process according to claim 11, wherein said catalyst comprises the oxide couple MoO$_3$-CoO, the weight ratio MoO$_3$/CoO of which ranges from 0.5 to 9.5.

15. A process according to claim 5, wherein said catalyst also comprises phosphorus in an amount expressed in weight of oxide P$_2$O$_5$ in relation to the weight of catalyst ranging from 0.1 to 15%.

16. A process according to claim 11, wherein said catalyst also comprises phosphorus in an amount expressed in weight of oxide P$_2$O$_5$ in relation to the weight of catalyst ranging from 0.1 to 15%.

17. A process according to claim 12, wherein said catalyst also comprises phosphorus in an amount expressed in weight of oxide P$_2$O$_5$ in relation to the weight of catalyst ranging from 0.1 to 15%.

18. A process according to claim 13, wherein said catalyst also comprises phosphorus in an amount expressed in weight of oxide P$_2$O$_5$ in relation to the weight of catalyst ranging from 0.1 to 15%.

19. A process according to claim 14, wherein said catalyst also comprises phosphorus in an amount expressed in weight of oxide P$_2$O$_5$ in relation to the weight of catalyst ranging form 0.1 to 15%.

20. A process according to claim 2, wherein said zeolite has a molar ratio SiO$_2$/Fe$_2$O$_3$ ranging from 50 to 750.

* * * * *